No. 664,668. Patented Dec. 25, 1900.
J. E. NOBLE.
AUTOMATIC THERMOSTATIC VALVE.
(Application filed May 17, 1900.)
(No Model.) 3 Sheets—Sheet 1.
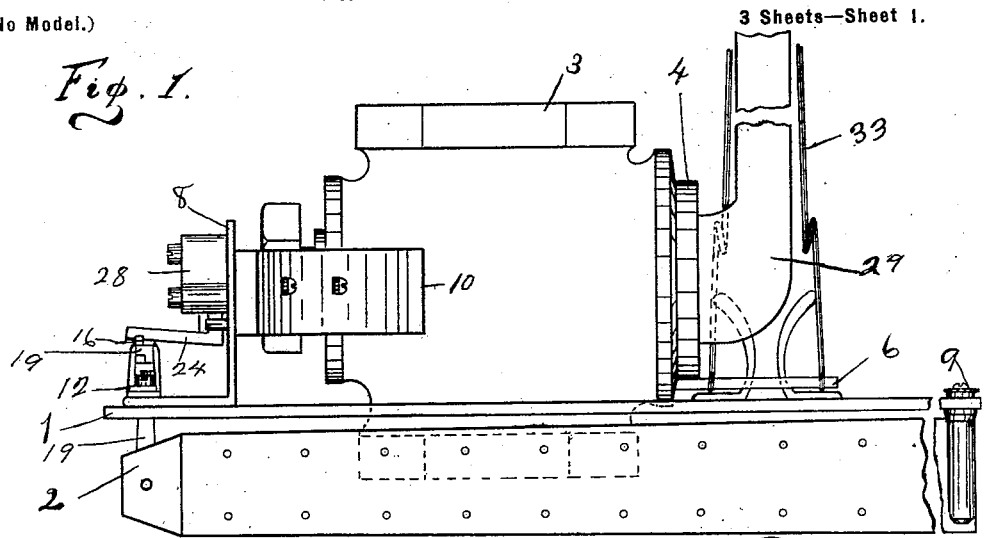
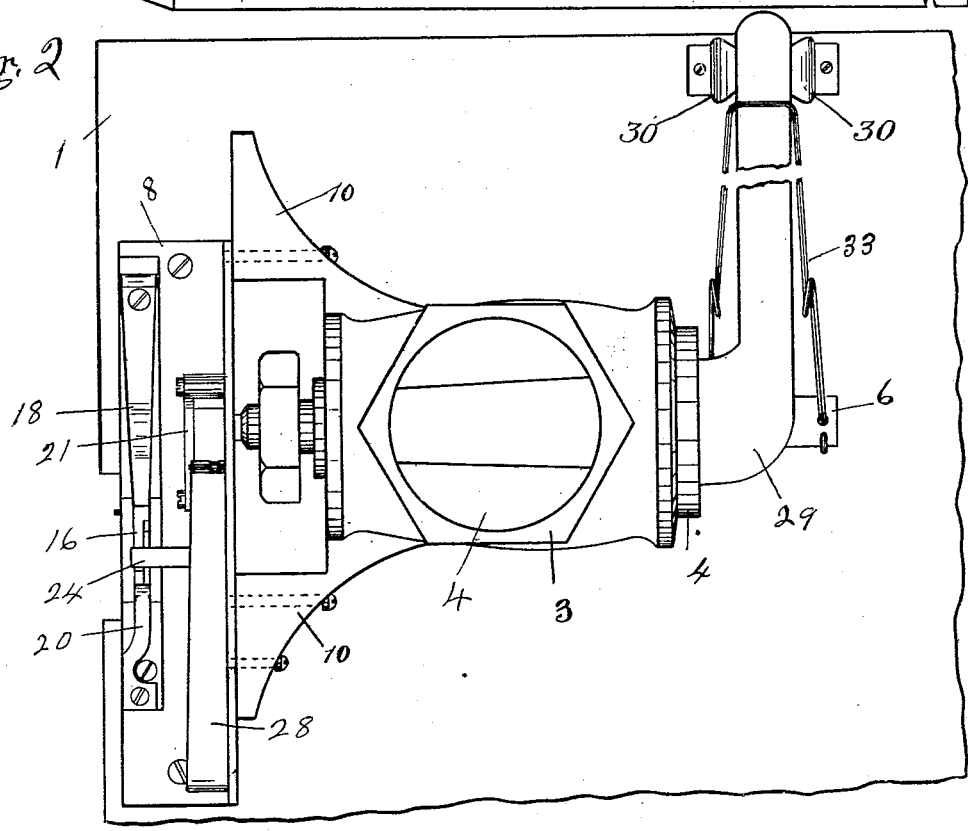
WITNESSES: Adelaide Kearns. Augusta Viberg.
John E. Noble INVENTOR
By Chapin & Denny
His ATTORNEYS No. 664,668. Patented Dec. 25, 1900.
J. E. NOBLE.
AUTOMATIC THERMOSTATIC VALVE.
(Application filed May 17, 1900.)
(No Model.) 3 Sheets—Sheet 2.
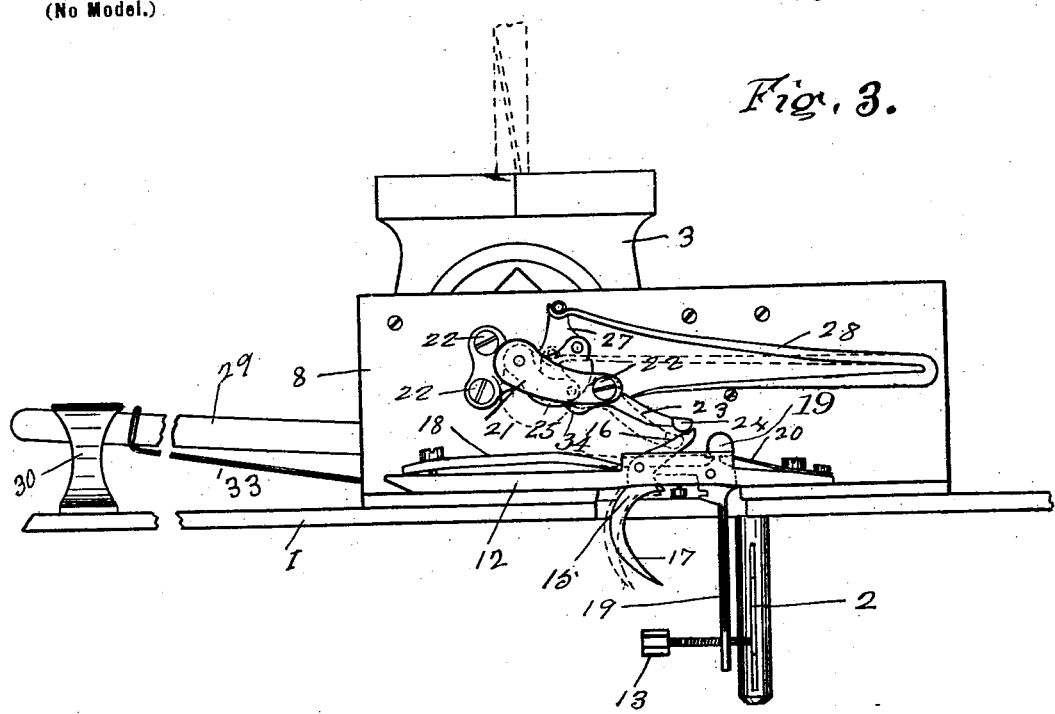
Fig. 3.
Fig. 4.
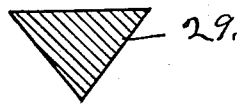
WITNESSES:
Adelaide Kearns.
Augusta Viberg.
John E. Noble  INVENTOR
By Chapin & Denny
His ATTORNEYS.
THE NORRIS PETERS CO., PHOTO-LITHO., WASHINGTON, D. C.

No. 664,668. Patented Dec. 25, 1900.
J. E. NOBLE.
AUTOMATIC THERMOSTATIC VALVE.
(Application filed May 17, 1900.)
(No Model.) 3 Sheets—Sheet 3.
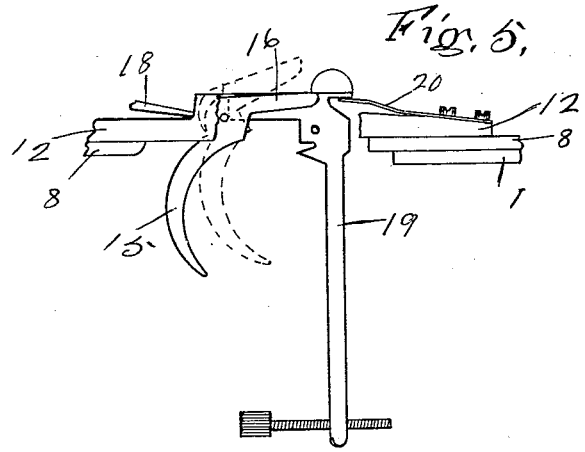
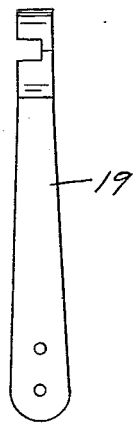
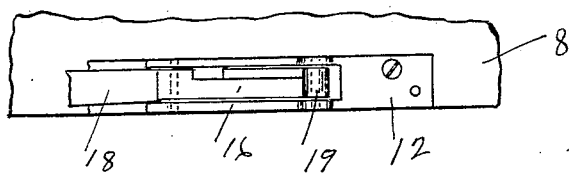
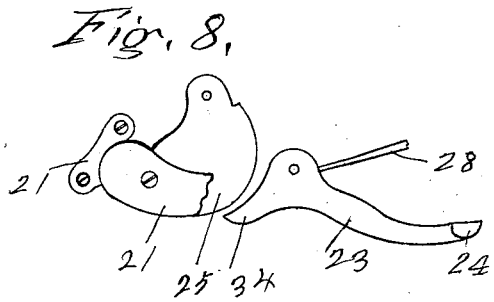
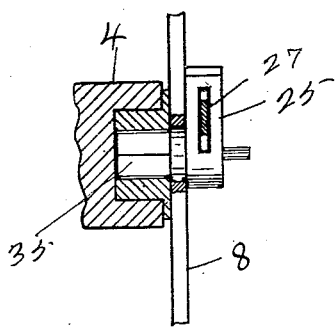
WITNESSES: John E. Noble INVENTOR
Adelaide Kearns. BY Chapin & Denny
Augusta Viberg. His ATTORNEYS
THE NORRIS PETERS CO., PHOTO-LITHO., WASHINGTON, D. C.

UNITED STATES PATENT OFFICE.

JOHN E. NOBLE, OF FORT WAYNE, INDIANA.

AUTOMATIC THERMOSTATIC VALVE.

SPECIFICATION forming part of Letters Patent No. 664,668, dated December 25, 1900.

Application filed May 17, 1900. Serial No. 16,984. (No model.)

*To all whom it may concern:*

Be it known that I, JOHN E. NOBLE, a citizen of the United States, residing at Fort Wayne, in the county of Allen, in the State of Indiana, have invented certain new and useful Improvements in Automatic Thermostatic Valves; and I do hereby declare that the following is a full, clear, and exact description of the invention, which will enable others skilled in the art to which it appertains to make and use the same, reference being had to the accompanying drawings, which form part of this specification.

My invention relates to improvements in automatic thermostatic valves.

The object of my present invention is to provide an automatic thermostatic-valve-actuating mechanism specially designed to be used in connection with a valve arranged in a water-pipe line to permit the flow of water, as in case of fire, and adapted to be actuated by the effect of heat upon a thermostatic plate or bar in operative connection therewith.

The principal novel feature of my invention is the operating of a spring by means of a thermostat-actuated lever which can be practically applied to numerous uses.

In the accompanying drawings similar reference-numerals indicate like parts throughout the several views, in which—

Figure 1 is a side view of my improvement, showing the relative arrangement of the operative parts with the valve closed. Fig. 2 is a plan view of the same, showing the valve open. Fig. 3 is an end view of the same, showing the relation of the parts of the lock when the valve is open and showing in dotted outline their relative arrangement when the valve is closed. Fig. 4 is an end view of the valve-lever in cross-section. Fig. 5 is an enlarged detail side view of the triggers 19 and 15, showing their relative arrangement. Fig. 6 is a side view of the trigger 19, taken at right angles to Fig. 5. Fig. 7 is a plan view of Fig. 5 with the spring 20 removed. Fig. 8 is an enlarged detail of the tumbler and lever 23, showing the relative arrangement of the projection 34. Fig. 9 is a detail, partly in section, showing the connection of the tumbler with the spigot-valve.

From a suitable base or pedestal 1, of proper material, is suspended a pendent horizontal thermostatic bar or plate 2, rigidly fixed at one end and having its other free end adapted to be moved laterally by the action of heat or cold and which may be adjusted to any desired position in the same horizontal plane by loosening the holding-screw 9. On the upper face of the said base 1 is rigidly fixed, in any suitable manner, a proper spigot-valve 4, of well-understood construction, rotably mounted in a proper valve-casing 3. This valve-casing is preferably set down in a proper opening in the base 1, though this is not a material matter. The valve-casing 3 is also provided with integral brackets 10 upon one end thereof, to which is rigidly bolted the angle-plate 8, on which is arranged any suitable spring mechanism, preferably a gun-lock mechanism, adapted to be tripped or actuated by the said thermostatic bar, thereby automatically actuating the said spigot-valve 4. This gun-lock mechanism, of well-understood construction, is arranged substantially as follows: A vertically-depending hair-trigger 19 is pivoted in the fixed plate 12, which may be integral, if desired, and works in a vertical slot therein, the lower end of said hair-trigger being provided with a laterally-disposed thumb-screw 13, which lies in the path of movement of the thermostatic bar 2 and may be lengthened or shortened to provide for more or less lateral movement of the said thermostatic bar, according to the effect of the temperature upon the same. A second trigger 15 is also pivoted in the said plate 12 and also works through a slot in the same. The trigger 15 is provided with an extension-piece or toe 16 and with a depending finger-piece 17. A stiff flat spring 18 has one end connected to the plate 12 and has its free end in engagement with a notch in the trigger 15, the tendency of said spring being to throw the toe 16 of said trigger up. When the trigger 15 is set, the toe 16 is held down by engagement with a notch formed in the head of the hair-trigger 19, the said trigger 19 being held in place by a flat spring 20, one end of which is fixed to the plate 12 and the other end being in engagement with a notch in said trigger 19. A flat plate or bridle 21 is bolted to the vertical portion of the angle-plate by the screw-bolts 22, so as to leave a space between the two plates. A lever 23 or sear pivoted between the two plates has at one end an arm 24, projecting at right angles thereto and projecting into the path of movement of the toe 16 on the trigger 15, the other end of the lever 23 forming a nose 34, which is adapted to engage an offset in a spring-controlled tumbler 25, pivoted between the bridle 21 and plate 8. The square end 35 of the tumbler 25 projects into a recess in the valve 4, which takes the place of the gun-hammer and is rotated in a similar manner by the tumbler 25. Pivoted to the free end of the tumbler 25 is a swivel 27, connected to the mainspring 28, as shown, the said tumbler being held against rotation or in a locked position and against the tension of said mainspring by the nose 34 engaging an offset in said tumbler, as hereinbefore described. The stem of the said spigot-valve is provided with an operating-lever 29. To a lug 6 on the outer end of the said valve-casing are fixed the ends of a wire bail-shaped spring 33, whose looped end is arranged in engagement with the said lever 29, the tension of said spring being exerted to assist in moving the said lever 29 in opening said valve. The outer free end of the lever 29 forms a plug and is adapted when the valve is opened to engage with the two insulated spring contact-points 30 of an electric signal-circuit to close said circuit and sound a gong or other alarm.

The operation of my device is as follows: In case of fire in a structure wherein my apparatus is located the heat from the same will cause said thermostatic bar to move laterally into engagement with the set-screw 13 of the hair-trigger 19 and pressing upon the same will release the toe 16 of the trigger 15, allowing the same to fly upwardly by reason of the spring 18 and strike-arm 24 of sear 23. The toe 16, striking the arm 24 of the sear 23, will cause the same to move upwardly and release nose 34 from engagement with the tumbler 25, allowing the spring 28 to turn said tumbler 25, and through the medium of the square end of said tumbler open said valve and allow the fire-extinguishing fluid to pass on and out upon the fire. The spring 33, exerting its tension upon the valve handle or lever 29, will tend to assist the spring 28 in opening said valve, and said lever upon reaching its lowest point will sound an alarm in the manner hereinbefore described. To close the valve and restore the parts to their locked positions, the valve handle or lever 29 is moved up to its former position.

While I have described my invention in connection with and to open and close a valve, it is obvious that I may use the same for many other purposes—such as, for instance, to open or close electric switches and to start or stop clockwork mechanism or spring motors—and it may also be used in connection with a three-way valve, and I therefore wish to reserve the right to use my invention in these and other connections.

Obviously the spring mechanism which connects the thermostat bar with the spigot-valve may be indefinitely varied without departing from the spirit and scope of my invention, which consists in controlling a valve by means of a direct connection between said valve and a thermostat-actuated trigger mechanism.

Having thus described my invention, what I claim, and desire to secure by Letters Patent, is—

1. In a thermostatic valve the combination of a spigot-valve; an actuating-tumbler connected directly to said valve, as shown; a trigger mechanism connected to said tumbler; and a thermostat adapted to release said mechanism.

2. The combination in a thermostatic valve of a rotary spigot-valve; a rocking tumbler operatively connected with said valve, as shown; a tripping mechanism connected with said tumbler; and a thermostat adapted to release said mechanism.

3. An oscillatory spigot-valve in combination with a rocking tumbler in operative relation with said valve; a tripping mechanism connected with said tumbler; and a thermostat adapted to release said tripping mechanism; and a spring-pressed lever connected to said valve to assist in operating the said valve.

4. A thermostatic valve consisting of an oscillatory spigot-valve 4 arranged in a proper valve-casing; a rocking tumbler in direct operative connection with said valve; a trigger mechanism connected with said tumbler; and a thermostat adapted to release said trigger mechanism.

Signed by me at Fort Wayne, Allen county, State of Indiana, this 14th day of May, A. D. 1900.

JOHN E. NOBLE.

Witnesses:
BELLE B. NOBLE,
ADELAIDE KEARNS.